United States Patent [19]

Wright et al.

[11] 4,349,578

[45] Sep. 14, 1982

[54] CONDENSED VEGETABLE SEED SOLUBLES ANIMAL FEED INGREDIENT

[75] Inventors: Kenneth N. Wright; Gilbert W. Griffel, Jr., both of Decatur, IL

[73] Assignee: A. E. Staley Manufacturing Company, Decatur, Ill.

[21] Appl. No.: 831,835

[22] Filed: Sep. 9, 1977

[51] Int. Cl.$^3$ .......................... A23K 1/00; A23L 1/14
[52] U.S. Cl. ...................... 426/630; 426/623; 426/634; 426/635; 426/807
[58] Field of Search ............... 426/623, 630, 634, 635, 426/656, 807, 658

[56] References Cited

U.S. PATENT DOCUMENTS

| | | | |
|---|---|---|---|
| Re. 25,337 | 2/1963 | Turner et al. | 426/630 |
| 3,246,336 | 4/1966 | Baribo et al. | 426/658 X |
| 3,532,503 | 10/1970 | Kviesitis | 426/807 |
| 4,012,535 | 3/1977 | Fiala et al. | 426/658 |

OTHER PUBLICATIONS

Perry et al., Nutritional Value of Condensed Soybean Solubles for Finishing Beef Cattle, 1974 Cattle Feeders Day Griffin Labs, pp. 25–27.

Miller et al., "Evaluation of Condensed Soybean Solubles in Pelleted Grower Rations", Michigan Ag. Res. Report 232, Sep. 1973, pp. 72–75.

Smith et al., "Soybeans Chemistry & Technology", vol. I. Av. Publishers 1972, pp. 297–298, 319 & 323–324.

*Primary Examiner*—R. B. Penland
*Attorney, Agent, or Firm*—M. Paul Hendrickson; Charles J. Meyerson

[57] ABSTRACT

A nutritious vegetable seed solubles binder for animal feed blocks. The subject vegetable seed solubles contain about 80% by weight carbohydrate and up to about 24% by weight protein on a dry substance basis. The new binder may be used as a complete or partial replacement for cane molasses as a binder in animal feed blocks, including those such as molasses/salt blocks, medicated feed blocks and high protein feed blocks. The subject vegetable seed solubles may also be combined with soybean hulls, bagasse or such similar material to make an ingredient which is then used to make animal feed blocks.

11 Claims, No Drawings

CONDENSED VEGETABLE SEED SOLUBLES ANIMAL FEED INGREDIENT

BACKGROUND

For a number of years, animal feed blocks have been made using molasses as the binder. However, recently, the quality and nature of some of the other ingredients used in the block make it difficult to produce a well-formed block with only molasses as the binder. The difficulty became most serious when attempts were made to make a high protein block using DSLC containing a relatively low level of steep liquor solids. When only cane molasses binder was used, the blocks coming out of the block-forming machine expanded and "fissured." Such blocks did not weather well in the field, and the livestock consumed them at too high a rate to get the desired controlled consumption. Molasses as a binder, therefore, has some limitations. The condensed vegetable solubles employed here as a binder have eliminated the above problems and are an excellent, nutritious binder in animal feed blocks.

DESCRIPTION OF THE PRIOR ART

British Patent Specification 297,235 accepted Sept. 20, 1928, describes an animal feed "brick" or "biscuit," but this brick mainly comprises mineral salts, drugs or chemicals, and sugar or glucose as a binder. The condensed vegetable seed solubles of the subject invention can also replace the sugar or glucose binder in this mineral/salt "brick" or "biscuit."

Canadian Pat. No. 624,812 issued Aug. 1, 1961 describes an animal feed supplement including calcium salts, sodium chloride, cottonseed meal, molasses and trace amounts of cobalt, copper, iron and manganese. The molasses serves as a binder in an amount of about 2.5% to 3.5% by weight of the total weight of the animal feed supplement. No suggestion of condensed vegetable seed solubles as a nutritious binder is made here.

The Purdue University Cattle Day Book for Mar. 22, 1974 carried an evaluation of condensed soybean solubles in animal feed. See: Perry et al., *The Nutritional Value of Condensed Soybean Solubles for Finishing Beef Cattle,* CATTLE DAY BOOK, Mar. 22, 1974, Purdue University Agricultural Experiment Station, Lafayette, Ind. Condensed soybean solubles (CSS) was compared to molasses for nutritional value. Various dry feed formulas were used, and based upon incomplete data, it was concluded the CSS could have a potential in animal feeds. The CSS used in this study contained about 8% protein, 35% carbohydrates and about 55-60% solids. CSS was being studied as a replacement for molasses in a dry cattle supplement. No effort was made to form a feed block using condensed soy solubles as a binder. The conclusion, based on 112 days into the feeding experiment, was that the rate of gain of cattle fed condensed soy solubles (CSS) was slightly less than that of cattle fed molasses in an otherwise comparable diet. E. R. Miller et al., *Condensed Soy Solubles in the Grower Ration,* JOURNAL ANIMAL SCIENCE 37:287 (Abstract) (1973), have studied the replacement of 5% molasses with 5% condensed soybean solubles in a pelleted swine ration which also contained corn-wheat-soybean meal. Miller and his co-workers reported that condensed soybean solubles would be very useful in replacing molasses in pelleted starter and grower rations. The pigs fed CSS containing rations gained significantly more than those pigs fed a ration containing the same amount of molasses.

Baribo et al. U.S. Pat. No. 3,246,336 issued Apr. 12, 1966, describes a molasses/salt block which has been widely marketed with considerable success. The wet binders there described include dehydrated and wet molasses and corn steep liquor. Edible fat or mineral oil are suggested when improved weathering properties for the feed block are desired. Cottonseed meal, soybean meal or corn oil meal are disclosed as protein containing carriers for the dehydrated molasses. No mention of condensed soybean solubles is made.

SUMMARY OF THE INVENTION

We have now found through additional feeding studies that the condensed soybean solubles have a very definite advantage over molasses in animal feed blocks, both as a binder of feed particles and also as a dietary source of nutrients. The condensed soybean solubles can replace all the molasses in a high protein animal feed block, and give superior density, texture and weathering properties to such a block. The use of condensed soybean solubles allows the use of a low soluble content DSLC which cannot be used with molasses without an adverse affect on the block.

DETAILED DESCRIPTION

Specific examples are set forth below showing how the condensed soy solubles may be used as a nutritive binder according to the method of the invention. It must be recognized that specific situations regarding quality, cost and availability of molasses, dried steep liquor concentrate and the other ingredients in the respective animal feed formula will dictate adjustments in the amount of the particular ingredients. Such necessary adjustments are considered more specifically in each example below.

EXAMPLE 1

Two animal feed blocks were made for comparison using the compositions set forth below:

| Ingredients | Block A Cane Molasses % | Block B Condensed Soy Solubles % |
| --- | --- | --- |
| Dried Steep Liquor Concentrate* | 58.45 | 58.45 |
| Soybean Meal (50% protein) | 15.00 | 15.00 |
| Salt | 12.80 | 12.80 |
| Cane Molasses | 10.00 | — |
| Condensed Soy Solubles | — | 10.00 |
| Animal Fat | 2.00 | 2.00 |
| Dicalcium Phosphate | 1.50 | 1.50 |
| Trace Minerals | 0.20 | 0.20 |
| Vitamin A | 0.0155 | 0.0155 |
| Vitamin D | 0.0032 | 0.0032 |
| Vitamin E | 0.008 | 0.008 |
| 44% Soybean Meal | 0.0233 | 0.0233 |
| | 100.0000% | 100.0000% |

ANIMAL FEED BLOCKS WITH MOLASSES OR CONDENSED SOY SOLUBLES

*42% Solubles

The above feed blocks were made generally by the method described in U.S. Pat. No. 3,246,336, using a standard block-making machine used to produce animal feed blocks. One such suitable machine is the Landers Feed Block Press, manufactured by the Landers Machine Company, Fort Worth, Tex.

Blocks A and Blocks B made using the above formulas were compared in all respects, including formability, appearance of the blocks, weathering, nutritional effect and consumption rates. An identical, low solubles dried steep liquor concentrate was used to make both Blocks A and Blocks B. The Blocks A immediately swelled when removed from the block-forming machine, and cracks and fissures appeared. When left in the field for feeding studies, the test animals consumed Blocks A at a rate which was higher than desired, apparently because any molasses level used failed to cause the block to have the desired hardness and texture. Blocks A did not weather well because of the cracks and fissures, and tended to disintegrate long before the desired feeding period had elapsed. The main objective of feeding dietary supplements in block form is to provide maximum feeding coverage with minimum labor. Controlled consumption and weathering are both extremely important for "free-choice" feeding. As pointed out by Baribo et al., the blocks can be put out in the open without cover where they can easily be reached by the animals as they feed. The excellent weathering resistance of the Blocks B of the subject invention makes it possible to put out sufficient blocks to provide the animals with up to several weeks of feeding. Such an advantage, combined with the controlled consumption described by Baribo et al., provides a superior "free-choice" animal feed block. Condensed soybean solubles used in the Blocks B above typically contain 50-70% dry solids; about 60-80% of the solids is carbohydrate; about 6-24% is protein (N%×6.25), and the moisture content of the block is about 8-12% when made with the above amount of 60-70% solids condensed soybean solubles.

The dried steep liquor concentrate (DSLC) used to make both Blocks A and Blocks B has a lower solubles level than that which is considered typical. The solubles level in the DSLC used was about 40-46% which comes to about 50% solids. In the past, the DSLC solubles level was about 50%, and the solids level about 58.8%. See test procedure for determining solubles level below.

The Official Publication of the Association of American Feed Control Officials defines condensed soybean solubles as the product obtained by washing soy flour or soybean flakes with water and acid at a pH of 4.2-4.6, which is then evaporated or concentrated to not less than 60% solids. See Paragraph 84.14 of 1977 Official Publication, AFCO, Page 111. Although such CSS materials can be used in the subject blocks, a CSS product obtained as a by-product of hexane/aqueous alcohol extraction of soybean flakes is preferred. The latter CSS material does not fit the above definition because alcohol is used instead of acid, and the washing of the soybean flour or soybean flakes is done at a neutral pH.

The dried steep liquor concentrate used in the subject formulas is within the description found in the above 1977 AFCO publication, Paragraph 48.28 Condensed Fermented Corn Extractives with Germ Meal and Bran, Dehydrated, Page 92. The subject definition is not specific about the amount of water removed. It has been found that when a DSLC having a soluble level of at least 46% is used to make blocks, molasses can be used as a binder. However, when the DSLC solubles level decreases to less than about 44%, then molasses does not perform as well as CSS as a binder in an animal feed block such as Blocks B of Example 1. Through experience, it has been determined that the DSLC employed should have a 6.5% moisture maximum, with a minimum of 30% protein, calculated on an "as is" basis. The percent nitrogen present is multiplied by 6.25 to determine the percent protein.

EXAMPLE 2

Another animal feed block containing about 37% protein is formed using the ingredients listed below:

| HIGH PROTEIN BLOCK | |
|---|---|
| Ingredients | % |
| Dried Steep Liquor Concentrate (42% Solubles) | 61.540 |
| Granulated Salt | 14.183 |
| Concentrated Soy Solubles | 12.700 |
| 45% Feed Grade Urea | 6.440 |
| Dicalcium Phosphate | 3.500 |
| Stabilized Animal Fat | 1.000 |
| Trace Minerals | 0.200 |
| Vitamin A | 0.0116 |
| Vitamin D$_3$ | 0.00192 |
| 44% Soybean Meal | 0.02348 |
| Swift 2245 Fluid Colloid (Swift Chemical Company) | 0.400 |
| | 100.000009 |

The above block proved to be an excellent dietary supplement as a source of protein in an animal feed diet. The blocks were slightly more dense and resilient than similar blocks made using a molasses binder, and their weather resistance proved to be superior to similar blocks made with molasses binder. Controlled consumption was also realized because the blocks remained intact over feeding periods of several weeks. The effect of the CSS binder may be described as a "gumball" effect. The blocks are more cohesive and flexible, and therefore more shock-resistant as well as more resistant to weather phenomena such as rain, heat, sun rays and cold.

EXAMPLE 3

It is also contemplated that CSS can replace dehydrated molasses in a dry feed product such as that described in Turner et al., U.S. Pat. No. Re. 25,337 reissued Feb. 26, 1963. Soybean millfeed may be used as an absorbent for condensed soybean solubles. The ratios set forth in the examples of the subject reissue patent may be used, with a straight substitution of CSS for blackstrap molasses in each case. The resulting free-flowing feed material may then be used as the main ingredient to make a CSS/salt block like the molasses/salt block described in Baribo et al. U.S. Pat. No. 3,246,336. The CSS can be used on a direct replacement basis for the molasses. The resulting feed block has superior weathering properties, and also contains some protein, which is largely lacking in the examples given in Baribo et al. As pointed out in Baribo et al., this new block may also contain various medications, such as "poloxalene" a bloat-control for cattle made by Wyandotte Chemical Company, and phenothiazine, an ingredient which has been used to control flies which deposit their eggs in the animal droppings. Other medications and nutrients may be included for various purposes, provided their use is approved by the appropriate regulating agency.

EXAMPLE 4

Condensed soybean solubles can also be used to replace molasses in a pelleted animal feed made using bagasse/bagasse pith from sugar cane milling. Such molasses/bagasse products are described in U.S. Pat.

No. 4,012,535 issued Mar. 15, 1977. The condensed soybean solubles may be substituted on a weight-for-weight basis. It is also possible to substitute other condensed vegetable seed solubles such as those solubles resulting from cottonseed processing. As described in the above patent, the pelleted animal feed may then be hammermilled into a crumbled product which may then be formed into an animal feed block as described above in Example 1.

Applicants have discovered that condensed soybean solubles are superior to molasses as a binder, both in pellets and in animal feed blocks. In addition, such solubles contain protein to provide an additional nutrient in the block. Other water soluble or aqueous alcohol soluble vegetable oil-seed materials which contain soluble protein and carbohydrates can be used instead of part or all of the condensed soybean solubles. The carbohydrates should include in particular polysaccharides such as sucrose, arabinose, stachyose, pentoses and other high molecular weight polysaccharides.

TEST PROCEDURE WATER SOLUBLES

The percent solubles of DSLC is determined by extracting a measured sample with water, filtering, and measuring the residue in the filtrate after evaporation.

A ten gram sample of the DSLC is placed in a flask with about 150 ml. water and shaken vigorously for $\frac{1}{2}$ hour. Additional water is added to make up a total of 200 ml. solution with thorough mixing. The solution is then filtered. The filtrate is collected and 10 ml. of filtrate is evaporated to dryness, and the weight of the residue is recorded. The % water solubles = grams residue $\times$ 200.

We claim:

1. An improved animal feed block characterized by its superior resistance to "fissuring" and weathering consisting essentially of about 55-65% by weight dried steep liquor concentrate, 10-20% vegetable seed meal, 5-40% salt, and 7-12% condensed vegetable seed solubles, said condensed vegetable seed solubles functioning as a nutritive binder which also imparts weather resistance and physical stability to said animal feed block.

2. The improved animal feed block of claim 1, in which the vegetable seed meal is soybean meal and the condensed vegetable seed solubles is condensed soybean solubles.

3. The improved animal feed block of claim 2, in which the dried steep liquor concentrate has a solubles level of about 42% of the total solids content thereof.

4. The improved animal feed block of claim 2, in which the solids level of the condensed soybean solubles is about 50-70% prior to forming said feed block.

5. The improved animal feed block of claim 2, in which the condensed soybean solubles contains about 6-9% protein and at least about 28% carbohydrate, and has a soluble level of at least about 60% on an as is basis prior to forming said feed block.

6. An improved animal feed block characterized by it superior resistance to fissuring and weathering consisting essentially of about 10-65% by weight dried steep liquor concentrate, 5-40% salt, about 8-12% moisture and 7-65% by weight condensed vegetable seed solubles, said condensed vegetable seed solubles functioning as a nutritive binder which also imparts weather resistance and physical stability to said animal feed block.

7. The improved animal feed block of claim 6, in which the condensed vegetable seed solubles is condensed soybean solubles.

8. The improved animal feed block of claim 7, in which the soluble level of the dried steep liquor concentrate is about 42% of the total solids content thereof.

9. The improved animal feed block of claim 7, in which the solids level of the condensed soybean solubles is about 50-70% prior to forming said feed block.

10. The improved animal feed block of claim 7, in which the condensed soybean solubles contains about 6-9% protein and at least about 28% carbohydrate, and has a soluble level of at least about 60% on an as is basis prior to forming said block.

11. An improved animal feed block having superior resistance to fissuring and weathering consisting essentially of 40-65% dried steep liquor concentrate containing about 40-70% steep liquor solids; about 10-20% of a vegetable seed meal selected from the group consisting of soybean, cottonseed, rapeseed, sesame seed, safflower seed, sunflower seed, peanuts, maize, yellow field pea and horse bean; 5-40% salt; and about 6-12% vegetable seed solubles, said vegetable seed solubles comprising vegetable materials which contain protein and carbohydrates including sucrose, raffinose, stachyose, pentoses, high molecular weight polysaccharides, and combinations thereof, said vegetable seed solubles being water soluble or aqueous alcohol soluble, and functioning as a nutritive binder which also imparts weather resistance and physical stability to said animal feed block.

* * * * *